US009091175B2

(12) United States Patent
Durocher et al.

(10) Patent No.: US 9,091,175 B2
(45) Date of Patent: Jul. 28, 2015

(54) HOLLOW CORE AIRFOIL STIFFENER RIB

(75) Inventors: Eric Durocher, Vercheres (CA); Maxime Demers, Longueuil (CA)

(73) Assignee: PRATT & WHITNEY CANADA CORP., Longueuil, QC (CA)

(*) Notice: Subject to any disclaimer, the term of this patent is extended or adjusted under 35 U.S.C. 154(b) by 923 days.

(21) Appl. No.: 13/216,613

(22) Filed: Aug. 24, 2011

(65) Prior Publication Data
US 2013/0052029 A1    Feb. 28, 2013

(51) Int. Cl.
F01D 5/14    (2006.01)
F01D 5/20    (2006.01)

(52) U.S. Cl.
CPC . F01D 5/147 (2013.01); F01D 5/20 (2013.01); Y10T 29/49339 (2015.01)

(58) Field of Classification Search
CPC ...... F01D 5/147; F01D 5/20; Y10T 29/49339
See application file for complete search history.

(56) References Cited

U.S. PATENT DOCUMENTS

| | | | |
|---|---|---|---|
| 2,458,975 A | 1/1949 | Brady | |
| 2,925,966 A | 2/1960 | Stalker | |
| 2,954,208 A | 9/1960 | Ewald et al. | |
| 3,171,631 A * | 3/1965 | Aspinwall | 416/90 R |
| 3,606,580 A | 9/1971 | Kaufman, Sr. | |
| 5,253,824 A | 10/1993 | Halila et al. | |
| 6,481,972 B2 * | 11/2002 | Wang et al. | 416/233 |
| 7,857,588 B2 | 12/2010 | Propheter-Hinckley et al. | |
| 8,241,003 B2 * | 8/2012 | Roberge | 416/229 R |

* cited by examiner

Primary Examiner — Nathaniel Wiehe
Assistant Examiner — Jeffrey A Brownson
(74) Attorney, Agent, or Firm — Norton Rose Fulbright Canada LLP

(57) ABSTRACT

A stiffener rib for a non-cooled, hollow core airfoil of a turbine blade is described. The stiffener rib is constituted by an elongated solid metal piece dimensioned for securement in a hollow region of a core portion of the airfoil. The stiffener rib is shaped and oriented upwards from a leading edge of the airfoil at a predetermined calculated angle to minimize mode 2 deformation of the blade at a trailing edge thereof while improving the rigidity of the turbine blade.

16 Claims, 2 Drawing Sheets

HOLLOW CORE AIRFOIL STIFFENER RIB

TECHNICAL FIELD

The present application relates to turbine airfoils, and more particularly to a hollow core turbine airfoils.

BACKGROUND ART

A challenge during design of a turbine blade is to clear dynamic modes in running range, especially mode 2 (M2) (generally defined as the "Stiff Wise Bending Mode"), which could be an issue for blade durability and engine certification. Blade airfoil tip cutback is used to solve the dynamic issue M2 for a non-cooled turbine blade. Also, airfoil core shape is made smaller or airfoil section at the blade root is made bigger to obtain the same dynamic results. Pedestal cores are added in the airfoil core to improve blade dynamics. Conventional design or approach is to reduce blade core size or cutback the airfoil tip at the trailing edge but those two types of approaches have significant and detrimental impacts on weight and efficiency of the blade. Room for improvement thus exists.

SUMMARY

In accordance with a general aspect, there is a gas turbine engine blade comprising an airfoil extending from a platform to a tip between a leading edge and a trailing edge, said airfoil having a hollow core extending from the platform to the tip, and a stiffener rib provided in the hollow core of said airfoil and extending across a thickness of the airfoil between opposed side walls of the hollow core, the stiffener rib having an elongated cross-section including a longitudinal length L greater than a width W, the stiffener rib having a longitudinal axis which is angled to have a radial upward component and an axial component in a direction away from the leading edge of the airfoil, the longitudinal axis of the stiffener rib extending through the trailing edge at a location adjacent to a trailing edge tip corner where the trailing edge meets the tip of the blade.

In accordance with another aspect, there is provided a stiffener rib for a non-cooled, hollow core airfoil of a turbine blade and wherein the stiffener rib is constituted by an elongated solid metal piece dimensioned for securement in a hollow region of a hollow core portion of the airfoil. The stiffener rib is shaped and oriented upwards from a leading edge of the airfoil at a predetermined calculated angle to minimize mode 2 deformation of the blade at a trailing edge thereof while improving the rigidity of the turbine blade.

In accordance with a still further broad aspect, there is provided a method of minimizing deflection of a trailing edge of non-cooled hollow core airfoil subject to mode-2 deformation. The method provides the steps of calculating by dynamic analytical model for mode 2 the dimensions and orientation of a stiffener rib for location in a hollow region of the hollow core airfoil. The method further comprises securing the stiffener rib across opposed side walls of the airfoil and oriented angularly upwards from a leading edge of the airfoil at a predetermined angle to minimize deflection of the blade at the trailing edge in the running range of the airfoil and improve the rigidity thereof.

BRIEF DESCRIPTION OF THE DRAWINGS

Reference is now made to the accompanying figures in which.

DESCRIPTION OF THE PREFERRED EMBODIMENTS

Figure 1:
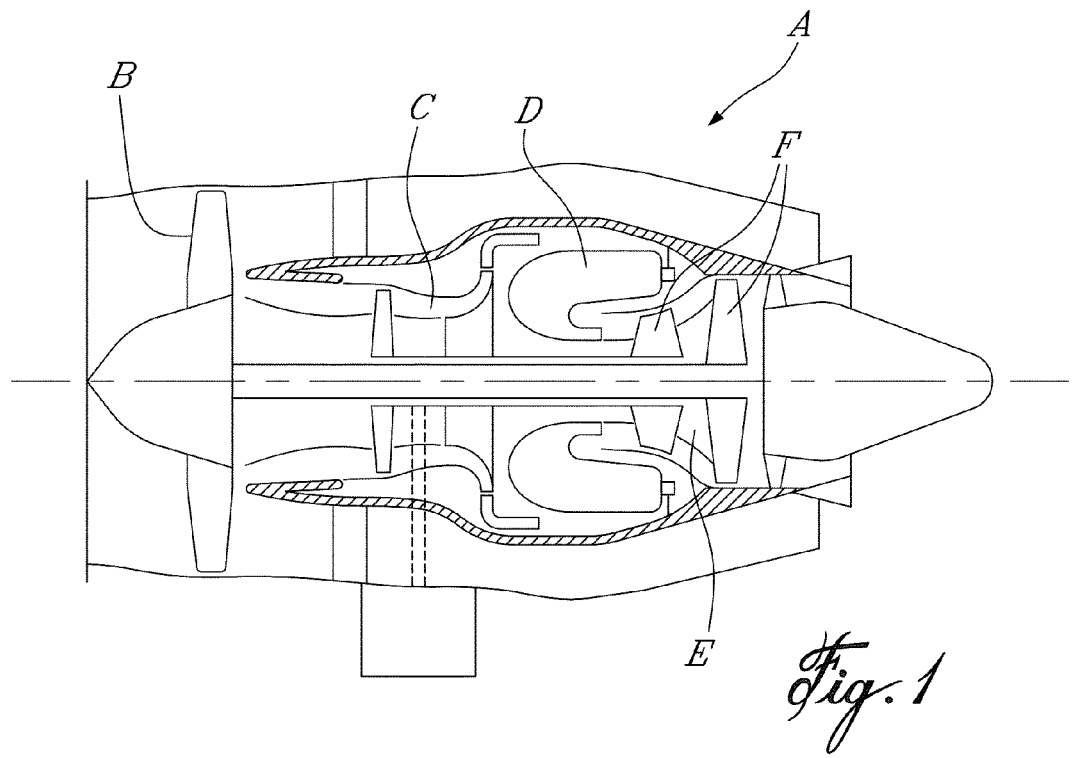
FIG. 1 is a schematic cross-sectional view of a gas turbine engine illustrating the location of the blades in the turbine section.

FIG. 1 illustrates a turbofan gas turbine engine A of a type preferably provided for use in subsonic flight, and generally comprising in serial flow communication a fan section B through which ambient air is propelled, a multi-stage compressor C for pressurizing the air, a combustor D in which the compressed air is mixed with fuel and ignited for generating an annular stream of hot combustion gases, and a turbine section E in which a series of rotating blades F are located and driven by the hot combustion gases. These rotating blades are coupled to a shaft and disc assembly as is well known in the art.

The combustor D usually operates at high temperature and the blades are subjected to this high temperature as well as high pressure and therefore must withstand these temperatures and pressures to prolong the life of the blades and reduce the likelihood of failure. A challenge is to clear dynamic modes in the running range of these blades especially mode 2 (M2) interference with upstream airfoil count wherein the combustor flow is strong in energy and could be an issue for blade durability and engine certification.

Figure 2:
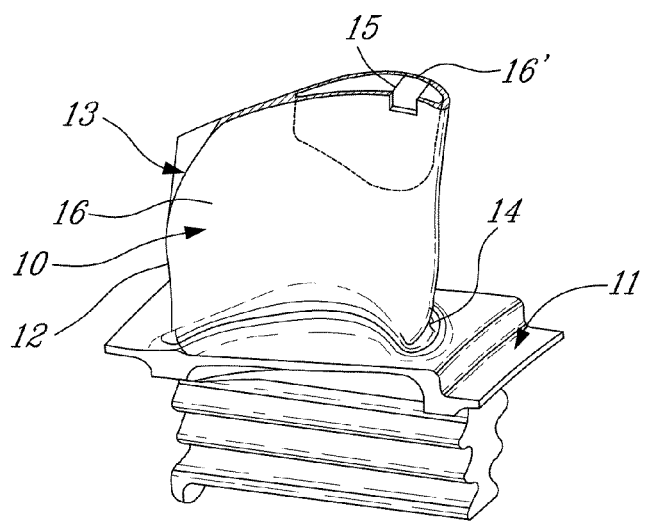
FIG. 2 is a partly fragmented perspective view showing a non-cooled turbine blade with a cutback section to reduce deformation of the trailing edge of the blade at frequency mode M2.

FIG. 2 illustrates, partly fragmented, an airfoil section 10 extending from the root 11 and wherein the airfoil trailing edge 12 has a cutback portion 13 used to solve the dynamic issue of M2 of flapping of the trailing edge. Also, the airfoil section at the blade root 11 are made bigger, such as at the location indicated by reference numeral 14 to obtain the same dynamic results. Pedestals 15, made of solid metal pieces are secured across the opposed side walls 16 and 16' of the hollow core airfoil to add stiffness but at the same time it adds weight to the airfoil. These prior art approaches have produced significant and detrimental impacts on weight and efficiency of the non-cooled hollow airfoil blade.

Figure 3:
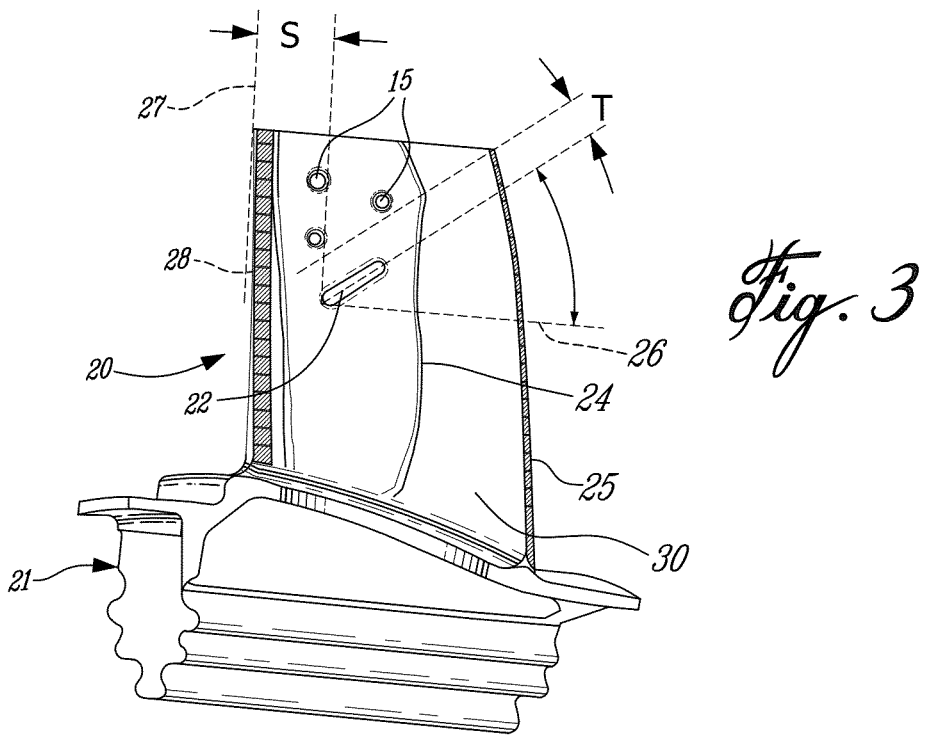
FIG. 3 is a partly fragmented side view of a non-cooled hollow core airfoil of a turbine blade showing the location of the stiffener rib and its orientation with respect the leading edge of the airfoil.
Figure 4:
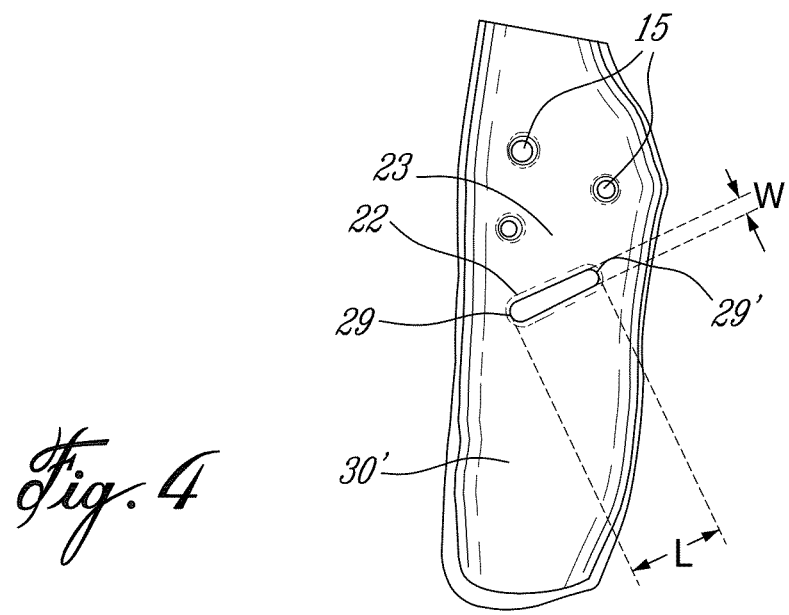
FIG. 4 is section view through the airfoil showing the shape and orientation of the stiffener rib.

With reference to FIGS. 3 and 4, there is shown generally at 20 a non-cooled, hollow core airfoil of a turbine blade extending from a blade root 21. As herein shown, the hollow core airfoil 20 is provided with a stiffener rib 22 which is made of an elongated solid metal piece which is secured in the hollow region 23 of the core portion 24 of the airfoil. The stiffener rib 22 is shaped and oriented upwards at a predetermined calculated angle to minimize the mode 2 deformation of the blade at the trailing edge 25 while improving the rigidity of the turbine blade. As can be appreciated from FIG. 3, the rib 22 is generally aligned with a trailing edge tip corner region of the blade.

According to one embodiment, the predetermined calculated angle may be in the range of from about 20° to 60° degrees from a horizontal reference axis 26 which extends transverse to a tip axis 27 of the leading edge 28 of the airfoil blade. A narrower possible range would between 23 to 43 degrees. For illustration purposes, the rib angle of the embodiment illustrated in FIGS. 3 and 4 is about 33° degrees from the reference axis 26. The rib angle is blade to blade dependent and the optimal effect depends of the frequency tuning and stress optimization.

The stiffener rib 22 as herein illustrated is a substantially elongated rectangular rib having opposed convex end edges 29 and 29' to facilitate molding or casting and the rib extends across the thickness of the hollow core airfoil and secured between opposed side walls 30 and 30' of the airfoil blade 20. By way of example, the rib 22 may have a length L which is comprised between about 0.150 to about 0.300 inches and a width W equal to about 0.050±0.025 inches. The rib 22 may be spaced from the leading edge 28 of the airfoil by a distance S of about 0.175±0.075 inches. As shown in FIG. 3, the distance T between an axis of the rib and an axis parallel thereto and extending through the tip trailing corner of the airfoil may be equal to 0.150±0.125 inches. The stiffener rib 22 is dimensioned and positioned to move the natural frequency M2 out of the running range of the rotating blades F illustrated in FIG. 1. The rib 22 is dimensioned by dynamic analytical model to determine its overall shape to tune the frequency of the turbine blade to substantially reduce or eliminate vibration at M2 and to permit the flow of air throughout the hollow core which is not cooled by external air.

The use of this stiffener rib provides a new method of minimizing deflection of a trailing edge of a non-cooled hollow core airfoil which is subject to mode 2 deformation. Summarizing it can be said that by calculating, by dynamic analytical model for mode 2, the dimensions of a stiffener rib for location in a hollow region of a core portion of the hollow core airfoil, such deflection of the trailing edge can be greatly minimized. The method comprises securing the stiffener rib across opposed side walls of the airfoil and orienting it angularly upwards from a leading edge of the airfoil at a predetermined angle to minimize deflection of the blade at the trailing edge and improve the rigidity thereof. The rib is secured at a predetermined angle in the range of about 20° to 60° degrees from a reference axis which extends transverse to a tip axis of the leading edge.

In view of the above, it can be appreciated that the stiffener rib can be designed and adapted to a wide variety of turbine or compressor blade non-cooled hollow core airfoils in order to change components stiffness and move natural frequency M2 out of the running range of a given blade. Based on dynamic analytical model, for mode 2, the shape and orientation of the stiffener rib is determined in relation to the blade deformation shape in order to minimize the deflection of the blade at the airfoil tip trailing edge location. The stiffener rib is located in the blade core and aligned with the blade tip trailing edge corner region to provide a more optimized solution in terms of weight and efficiency compared to the conventional design approaches. The stiffener rib improves blade stiffness and meets dynamic requirements for engine certification and improves the blade durability. The blade may be made lighter than the conventional blade design and better aerodynamic efficiency is achieved as compared the conventional blade cutback approach.

The above description is meant to be exemplary only, and one skilled in the art will recognize that changes may be made to the embodiment described therein without departing from the scope of the invention disclosed. While the invention has been described in the context of un-cooled hollow turbine blade airfoil, it is understood that the same principles could also be applied to other types of hollow core airfoils, including hollow compressor blades. It is therefore within the ambit of the present invention to cover any obvious modifications provided that these modifications fall within the scope of the appended claims.

What is claimed is:

1. A gas turbine engine blade comprising an airfoil extending from a platform to a tip between a leading edge and a trailing edge, said airfoil having a hollow core portion adjacent said leading edge and spaced-apart from said trailing edge in a chordwise direction, the hollow core portion extending from the platform to the tip, and a stiffener rib provided in the hollow core portion of said airfoil and extending across a thickness of the airfoil between opposed side walls of the hollow core portion, the stiffener rib being positioned closer to the leading edge than the trailing edge in the chordwise direction, the stiffener rib having an elongated cross-section including a longitudinal length L greater than a width W, the stiffener rib having a longitudinal axis which is angled to have a radial upward component and an axial component in a direction away from the leading edge of the airfoil, the longitudinal axis of the stiffener rib extending through the trailing edge at a location adjacent to a trailing edge tip corner where the trailing edge meets the tip of the blade.

2. The blade defined in claim 1, wherein the stiffener rib is positioned and oriented to minimize mode 2 deformation at the trailing edge, and wherein the stiffener rib extends at about 20° to 60° degrees from a reference axis extending transverse to a tip axis of the leading edge.

3. The blade defined in claim 2, wherein the stiffener rib extends at about 33° degrees from the reference axis.

4. The blade defined in claim 1, wherein said stiffener rib is an elongated hollow rectangular rib having opposed convex end edges.

5. The blade defined in claim 2, wherein the distance T between the longitudinal axis of the stiffener rib and an axis parallel thereto and extending through the trailing edge tip corner is equal to or less than 0.275 inches.

6. The gas turbine engine defined in claim 1, wherein the stiffener rib is spaced from the leading edge by a distance S of about 0.175±0.075 inches.

7. A stiffener rib for a non-cooled, hollow core airfoil of a turbine or compressor blade, said stiffener rib being constituted by an elongated solid metal piece positioned in a hollow region of a hollow core portion of said airfoil adjacent to a leading edge of the airfoil and spaced-apart from a trailing edge of the airfoil in a chordwise direction, and said stiffener rib being shaped and oriented upwards from a leading edge of said airfoil at a predetermined calculated angle to minimize mode 2 deformation of said blade at a trailing edge thereof while improving the rigidity of said turbine blade, and wherein the stiffener rib is positioned closer to the leading edge than the trailing edge in a chordwise direction.

8. The stiffener rib as claimed in claim 7, wherein said predetermined calculated angle is in the range of from about 20° to 60° degrees from a reference axis extending transverse to a tip axis of said leading edge.

9. The stiffener rib as claimed in claim 8, wherein said predetermined angle is equal to about 33° degrees.

10. The stiffener rib as claimed in claim 7, wherein said stiffener rib extends across the thickness of said hollow core airfoil and secured between opposed side walls of said airfoil.

11. The stiffener rib as claimed in claim 7, wherein said stiffener rib is dimensioned to move the natural frequency mode 2 out of running range of said turbine blade.

12. The stiffener rib as claimed in claim 11, wherein said stiffener rib is dimensioned in length to tune the frequency of said turbine blade and to permit the flow of air throughout said hollow core.

13. The stiffener rib as claimed in claim 7, wherein said stiffener rib is an elongated rectangular rib having opposed convex end edges.

14. A method of minimizing deflection of a trailing edge of a non-cooled hollow core airfoil subject to mode-2 deformation, comprising the steps of:
- i) calculating by dynamic analytical model for mode 2 the dimension and orientation of a stiffener rib for location in a hollow region of a core portion of said hollow core airfoil adjacent to a leading edge of the airfoil and spaced-apart from the trailing edge of the airfoil in a chordwise direction, and
- ii) securing said stiffener rib across opposed side walls of said airfoil and oriented angularly upwards from a leading edge of said airfoil at a predetermined angle to minimize deflection of said blade at said trailing edge in the running range of said airfoil and improve the rigidity thereof, the stiffener rib being positioned closer to the leading edge than the trailing edge in a chordwise direction.

15. The method as claimed in claim 14, wherein said step (ii) comprises securing said stiffener rib at a predetermined calculated angle in the range of from about 20° to 60° degrees from a reference axis extending transverse to a tip axis of said leading edge.

16. The method as claimed in claim 15, wherein said calculated angle is approximately 33° degrees.

* * * * *